United States Patent
Kwon et al.

(10) Patent No.: US 10,541,729 B2
(45) Date of Patent: Jan. 21, 2020

(54) COMMUNICATION SYSTEM USING WIRELESS POWER

(71) Applicant: SAMSUNG ELECTRONICS CO., LTD., Suwon-si (KR)

(72) Inventors: Ui Kun Kwon, Hwaseong-si (KR); Sang Joon Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 13 days.

(21) Appl. No.: 15/295,129

(22) Filed: Oct. 17, 2016

(65) Prior Publication Data

US 2017/0033838 A1 Feb. 2, 2017

Related U.S. Application Data

(63) Continuation of application No. 13/597,780, filed on Aug. 29, 2012, now Pat. No. 9,479,226.

(30) Foreign Application Priority Data

Sep. 2, 2011 (KR) .................. 10-2011-0088797

(51) Int. Cl.
*H04B 5/00* (2006.01)
*H02J 50/12* (2016.01)
*H02J 7/02* (2016.01)

(52) U.S. Cl.
CPC ............ *H04B 5/0037* (2013.01); *H02J 7/025* (2013.01); *H02J 50/12* (2016.02); *H04B 5/0031* (2013.01); *H04B 5/0081* (2013.01); *H04B 5/0062* (2013.01)

(58) Field of Classification Search
CPC .. H04B 5/0037; H04B 5/0093; H04B 5/0081; H04B 5/0031; H04B 5/0062; H04B 5/02;
(Continued)

(56) References Cited

U.S. PATENT DOCUMENTS

2006/0220859 A1* 10/2006 Nagai ................ B41J 3/50
340/572.1
2007/0082611 A1* 4/2007 Terranova ............ H04B 5/0012
455/41.1
(Continued)

FOREIGN PATENT DOCUMENTS

CN 101136556 A 3/2008
CN 101789638 A 7/2010
(Continued)

OTHER PUBLICATIONS

Chinese Office Action dated May 29, 2015 in counterpart Chinese Application No. 201210315434.1 (25 pages, with English translation).
(Continued)

*Primary Examiner* — Golam Sorowar
(74) *Attorney, Agent, or Firm* — NSIP Law

(57) ABSTRACT

Provided are a devices, systems and methods for performing communication using wireless power. According to one general aspect, a communication device using wireless power may include: a controller configured to control mutual resonance between a target resonator and a source resonator; a demodulator configured to demodulate information transmitted from the source resonator based on an amount of energy received from the source resonator; and a modulator configured to modulate information based on the mutual resonance.

20 Claims, 12 Drawing Sheets

(58) Field of Classification Search
CPC ...... H04B 5/0075; H04B 5/00; H04B 5/0025; H04B 5/0087
See application file for complete search history.

(56) References Cited

U.S. PATENT DOCUMENTS

| | | | |
|---|---|---|---|
| 2008/0252254 A1* | 10/2008 | Osada | H01M 10/0436 320/108 |
| 2009/0027169 A1* | 1/2009 | Kondo | G06K 7/0008 340/10.2 |
| 2009/0170433 A1 | 7/2009 | Rhodes et al. | |
| 2010/0104031 A1 | 4/2010 | Lacour | |
| 2011/0043049 A1 | 2/2011 | Karalis et al. | |
| 2011/0130093 A1 | 6/2011 | Walley et al. | |
| 2011/0133569 A1* | 6/2011 | Cheon | H02J 17/00 307/104 |
| 2011/0159812 A1 | 6/2011 | Kim et al. | |
| 2012/0262000 A1 | 10/2012 | Urano | |
| 2012/0294386 A1* | 11/2012 | Ghovanloo | A61N 1/3727 375/295 |

FOREIGN PATENT DOCUMENTS

| | | |
|---|---|---|
| CN | 102113195 A | 6/2011 |
| CN | 102570624 A | 7/2012 |
| CN | 102843170 A | 12/2012 |
| CN | 103210620 A | 7/2013 |
| EP | 2 538 573 A2 | 12/2012 |
| JP | 11-120306 A | 4/1999 |
| JP | 2010-141966 A | 6/2010 |
| KR | 10-2010-00624416 A | 6/2010 |
| KR | 10-2010-0112400 A | 10/2010 |
| KR | 10-2011-0037732 A | 4/2011 |
| WO | WO 2010/025157 A1 | 3/2010 |
| WO | WO 2011/063358 A2 | 5/2011 |
| WO | WO 2013/028038 A2 | 2/2013 |

OTHER PUBLICATIONS

Extended European Search Report dated Jul. 25, 2016 in counterpart European Application No. 12182199.5. (8 pages in English).
Chinese Office Action dated Sep. 20, 2016 in counterpart Chinese Application No. 201210315434.1. (33 pages in Chinese with English translation).

* cited by examiner

FIG. 8
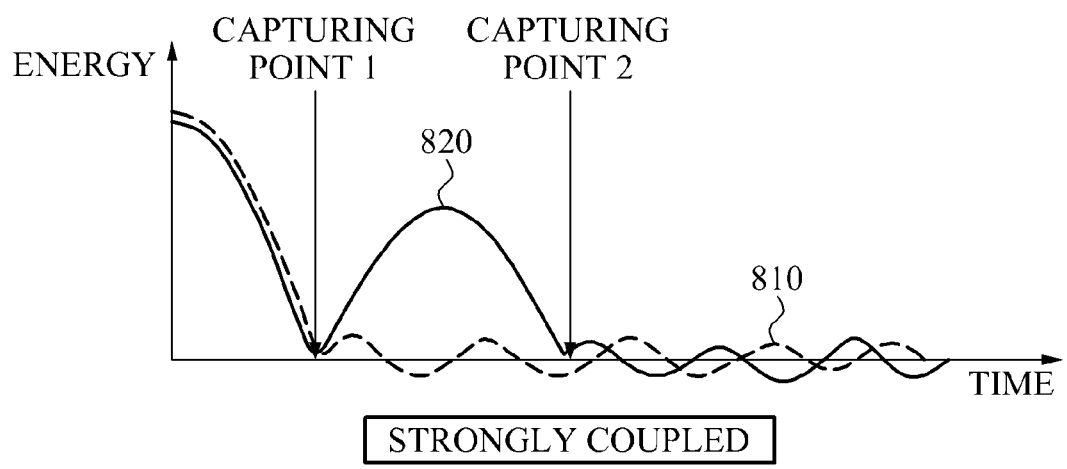
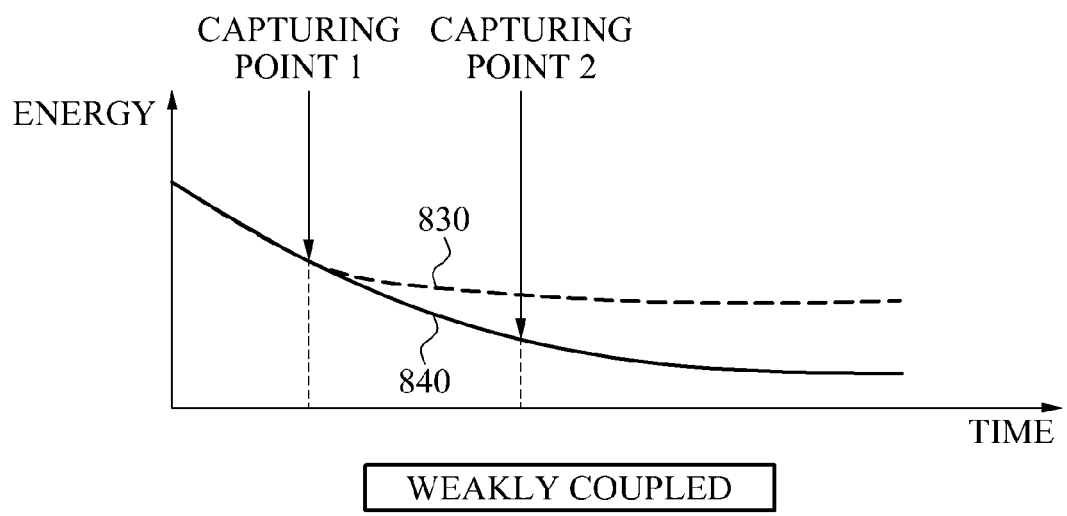

FIG. 12
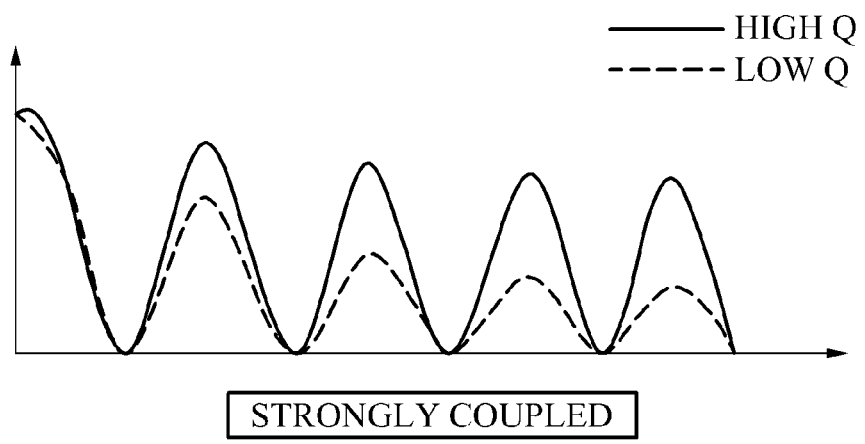
STRONGLY COUPLED
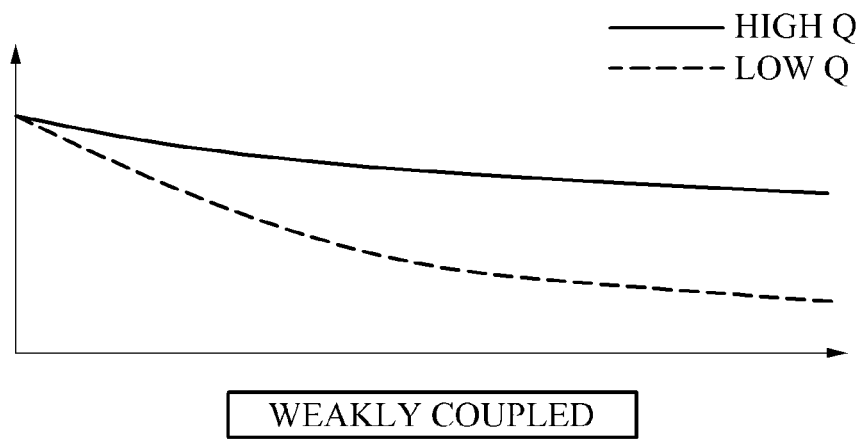
WEAKLY COUPLED

COMMUNICATION SYSTEM USING WIRELESS POWER

CROSS-REFERENCE TO RELATED APPLICATION(S)

This application is a continuation of U.S. patent application Ser. No. 13/597,780 filed on Aug. 29, 2012, which claims the benefit under 35 U.S.C. § 119(a) of Korean Patent Application No. 10-2011-0088797, filed on Sep. 2, 2011, in the Korean Intellectual Property Office, the entire disclosure of which is incorporated herein by reference for all purposes.

BACKGROUND

1. Field

The following description relates to performing communications using wireless power.

2. Description of Related Art

Research into wireless power transmission has been conducted to address the limited capacity of conventional batteries, and the inconvenience of wired power for portable devices, and the like. The research is mainly focused on near-field wireless power transmission. Near-field wireless power transmission refers to a case in which a distance between transmission and reception coils is sufficiently short when compared to a wavelength at an operating frequency. One conventional wireless power transmission and reception system uses a resonance characteristic and may include a source for providing power and a target for receiving power. In a process of transmitting and receiving wireless power, the source and the target may share control information.

SUMMARY

According to one general aspect, a communication device using wireless power may include: a controller configured to control mutual resonance between a target resonator and a source resonator; a demodulator configured to demodulate information transmitted from the source resonator based on an amount of energy received from the source resonator; and a modulator configured to modulate information based on the mutual resonance.

The controller may control a time interval for the mutual resonance between the target resonator and the source resonator.

The controller may control a time interval for storing energy in the target resonator through the mutual resonance and a time interval for capturing the energy stored in the target resonator.

The modulator may modulate the information based on the time interval for mutual resonance.

The controller may control the target resonator so that the target resonator receives energy, transmitted from the source resonator, through mutual resonance for one or more symbol duration times, and determine whether at least one target resonator, other than the target resonator, mutually resonates with the source resonator.

The modulator may modulate the information based on whether the at least one target resonator and the source resonator mutually resonate.

The communication device may further include: an energy adjuster configured to adjust an amount of energy expended in the target resonator, wherein the controller controls a resonant frequency of the target resonator so that the target resonator and the source resonator mutually resonate.

The energy adjuster may adjust, using an active element or a passive element, the amount of energy expended in the target resonator so that a Quality (Q) factor of the target resonator has a quantized value.

The modulator may modulate the information based on the amount of energy expended.

The communication device may further include: a receiver configured to receive energy transmitted from the source resonator through mutual resonance between the target resonator and the source resonator.

The controller may control an electrical connection between the target resonator and a load to which the received energy is delivered.

According to another general aspect, a communication device using wireless power may include: a modulator configured to modulate information based on an amount of energy stored in a source resonator; a demodulator configured to demodulate information transmitted from a target resonator based on a variation of a waveform of energy stored in the source resonator through mutual resonance between the source resonator and the target resonator; and a controller configured to control an amount of energy delivered to the source resonator from a power supply device.

The demodulator may demodulate the information transmitted from the target resonator based on a point in time at which the waveform of the energy varies within a symbol duration time.

The demodulator may demodulate the information transmitted from the target resonator based on the magnitude of the energy within a symbol duration time.

The demodulator may determine whether a mutual resonance occurs between the source resonator and the target resonator based on the waveform of the energy within a symbol duration time, and demodulate information transmitted from the target resonator based on whether the mutual resonance occurs.

The controller may control an electrical connection between the power supply device and the source resonator.

The communication device may further include: a transmitter configured to transmit the energy stored in the source resonator through the mutual resonance.

The communication device may further include: an energy adjuster configured to adjust an amount of energy expended in the source resonator.

The energy adjuster may adjust the amount of energy expended in the source resonator using an active element or a passive element.

According to yet another general aspect, a communication system using wireless power may include: a first modulator configured to modulate information based on an amount of energy stored in a source resonator; a first demodulator configured to demodulate information transmitted from a target resonator based on a variation of a waveform of the energy stored in the source resonator through a mutual resonance between the source resonator and the target resonator; a first controller configured to control an amount of energy delivered to the source resonator from a power supply device; a second controller configured to control mutual resonance between the target resonator and the source resonator; a second demodulator configured to demodulate information transmitted from the source resonator based on an amount of energy received from the source resonator; and a second modulator to modulate information based on the mutual resonance.

The second controller may control a time interval for the mutual resonance between the target resonator and the source resonator.

The communication system may further include: an energy adjuster configured to adjust an amount of energy expended in the target resonator, wherein the second controller controls a resonant frequency of the target resonator so that the target resonator and the source resonator mutually resonate.

The energy adjuster may adjust, using an active element or a passive element, the amount of energy expended in the target resonator so that a Quality (Q) factor of the target resonator has a quantized value.

According to still another general aspect, a communication method using wireless power may include: controlling mutual resonance between a target resonator and a source resonator; demodulating information transmitted from the source resonator based on an amount of energy received from the source resonator; and modulating information based on the mutual resonance.

According to a further general aspect, a communication method using wireless power may include: modulating information based on an amount of energy stored in a source resonator; demodulating information transmitted from a target resonator based on a variation of a waveform of energy stored in the source resonator through a mutual resonance between the source resonator and the target resonator; and controlling an amount of energy delivered to the source resonator from a power supply device.

Other features and aspects will be apparent from the following detailed description, the drawings, and the claims.

BRIEF DESCRIPTION OF THE DRAWINGS

FIG. 8 is a graph illustrating a waveform of one signal applied to a source resonator in response to adjusting a time interval for a mutual resonance at a reception end of a communication system using wireless power.

FIG. 12 is a graph illustrating a waveform of one signal applied to a source resonator when a Quality (Q) value of the source resonator varies in a communication system using wireless power.

Figure 1:
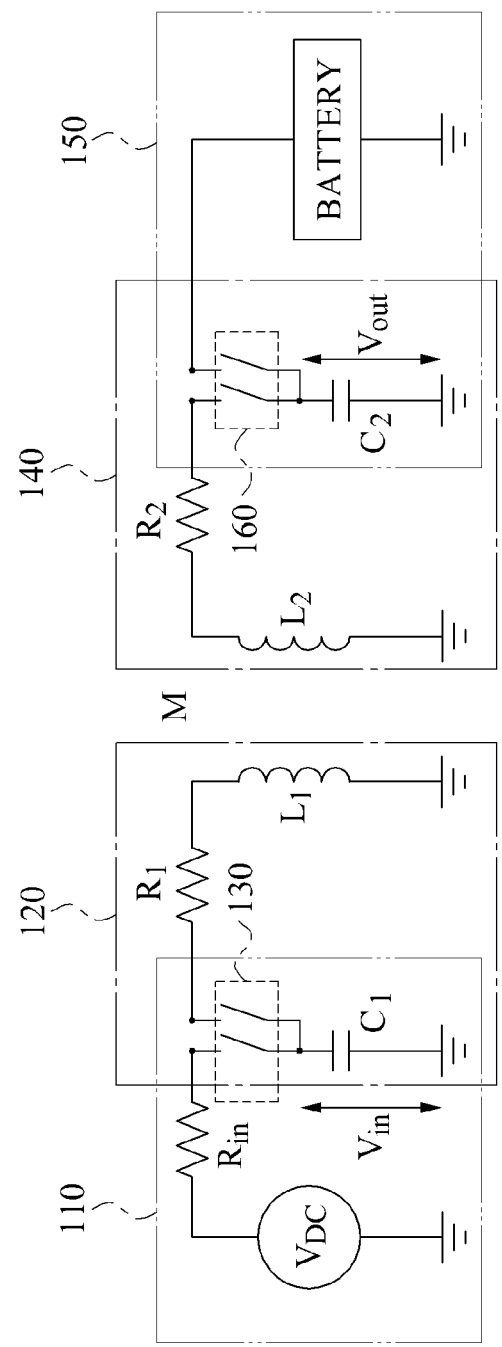
FIG. 1 is a diagram illustrating an equivalent circuit of a communication system using wireless power in which a power input unit and a power transmission unit are physically isolated by a capacitor and a switch unit, and a receiver and a power output unit are physically isolated by another capacitor and another switch unit.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, description of well-known functions and constructions may be omitted for increased clarity and conciseness.

A communication system using wireless power according to an aspect may be applied to various systems using a wireless power transmission. For instance, the communication system may be used for exchanging control information and other types of information between a transmission end and a reception end in a system using a wireless power transmission such as a cell phone, a wireless television (TV), and the like. In addition, the communication system may be applied to a bio-healthcare field and thus, may be used for remotely transmitting power to a device inserted into a body, or for wirelessly transmitting power to a bandage-type device for measuring a heartbeat.

A communication system using wireless power according to another aspect may be applied to a remote control of an information storage device excluding a power source. The communication system may be applied to a system for remotely providing power for driving a device to the information storage device, and for wirelessly loading information stored in the information storage device.

The communication system using wireless power may generate a signal by storing energy from a power supply device in a source resonator, and turning off a switch that electrically connects the power supply device and the source resonator, thereby inducing self-resonance of the source resonator. When a target resonator having the same resonant frequency as a resonant frequency of a self-resonating source resonator is sufficiently near to the source resonator to couple with the source resonator, a mutual resonance may occur between the source resonator and the target resonator. The source resonator may refer to a resonator provided with energy from a power supply device, and the target resonator may refer to a resonator receiving energy delivered through a mutual resonance.

FIG. 1 illustrates an equivalent circuit of a communication system using wireless power in which a power input unit 110 and a power transmission unit 120 are physically isolated by a capacitor $C_1$ and a switch unit 130, and a receiver 140 and a power output unit 150 are physically isolated by a capacitor $C_2$ and a switch unit 160.

Referring to FIG. 1, the communication system using wireless power may correspond to a source-target configuration having a source and a target. The communication system using wireless power may include a wireless power transmission device corresponding to a source and a wireless power reception device corresponding to a target.

The wireless power transmission device may include the power input unit 110, the power transmission unit 120, and the switch unit 130. The power input unit 110 may store energy in the capacitor $C_1$ using a power supply device. The switch unit 130 may connect the capacitor $C_1$ to the power input unit 110 while energy is stored in the capacitor $C_1$, and may disconnect the capacitor $C_1$ from the power input unit 110 so that the capacitor $C_1$ may be connected to the power transmission unit 120 while energy stored in the capacitor $C_1$ is discharged. Thus, the switch unit 130 may prevent the capacitor $C_1$ from being simultaneously connected to the power input unit 110 and the power transmission unit 120.

The power transmission unit 120 may transfer electromagnetic energy to the receiver 140. A transmission coil $L_1$ of the power transmission unit 120 may transfer power through a mutual resonance with a reception coil $L_2$ of the receiver 140. The level of mutual resonance occurring between the transmission coil $L_1$ and reception coil $L_2$ may be affected by a mutual inductance M.

The power input unit 110 may include an input voltage $V_{DC}$, an internal resistance $R_{in}$, and a capacitor $C_1$, the power transmission unit 120 may include basic circuit elements $R_1$, $L_1$, and $C_1$ which reflect a physical property corresponding to the power transmission unit 120, and the switch unit 130 may include one or more switches. An active device may be used as a switch to perform an ON and OFF function. As will be appreciated, R denotes a resistance component, L denotes an inductor component, and C denotes a capacitance component. Voltage across the capacitor $C_1$ corresponding to a portion of the input voltage $V_{DC}$ may be indicated by $V_{in}$.

The wireless power reception device may include the receiver 140, the power output unit 150, and the switch unit 160. The receiver 140 may receive electromagnetic energy from the power transmission unit 120. The receiver 140 may store received electromagnetic energy in a connected capacitor. The switch unit 160 may connect the capacitor $C_2$ to the receiver 140 while energy is stored in the capacitor $C_2$, and may disconnect the capacitor $C_2$ from the receiver 140 so that the capacitor $C_2$ may be connected to the power output unit 150 while energy stored in the capacitor $C_2$ is delivered to a load. The switch unit 160 may prevent the capacitor $C_2$ from being simultaneously connected to the receiver 140 and the power output unit 150.

A reception coil $L_2$ of the receiver 140 may receive power through a mutual resonance with the transmission coil $L_1$ of the power transmission unit 120. Using the received power, the capacitor $C_2$ connected to the reception coil $L_2$ may be charged. As shown, the power output unit 150 may deliver the power charged in the capacitor $C_2$ to a battery. Alternatively or additionally, the power output unit 150 may deliver power to a load or a target device.

The receiver 140 may include circuit elements $R_2$, $L_2$, and $C_2$ by reflecting a physical property corresponding to the receiver 140, the power output unit 150 may include the capacitor $C_2$ and the battery, and the switch unit 160 may include one or more switches. The voltage across the capacitor $C_2$ corresponding to a portion of the energy received by the reception coil $L_2$ may be indicated by $V_{out}$.

As described in the foregoing, a resonator isolation (RI) system for transmitting power by physically isolating the power input unit 110 and the power transmission unit 120, and the receiver 140 and the power output unit 150 may be advantageous especially when compared to a conventional scheme using an impedance matching. In some instances, a power amplifier may not be used since power may be supplied directly from a direct current (DC) source to a source resonator. And, in some instances, rectification performed by a rectifier may not be needed since energy is captured from power stored in a capacitor at a reception end. Transmission efficiency may not be responsive to the change in a distance between a transmission end and a reception end since impedance matching may not be used. The RI system may be easily extended to a communication system that uses wireless power and includes a plurality of transmission ends and a plurality of reception ends.

Figure 2:
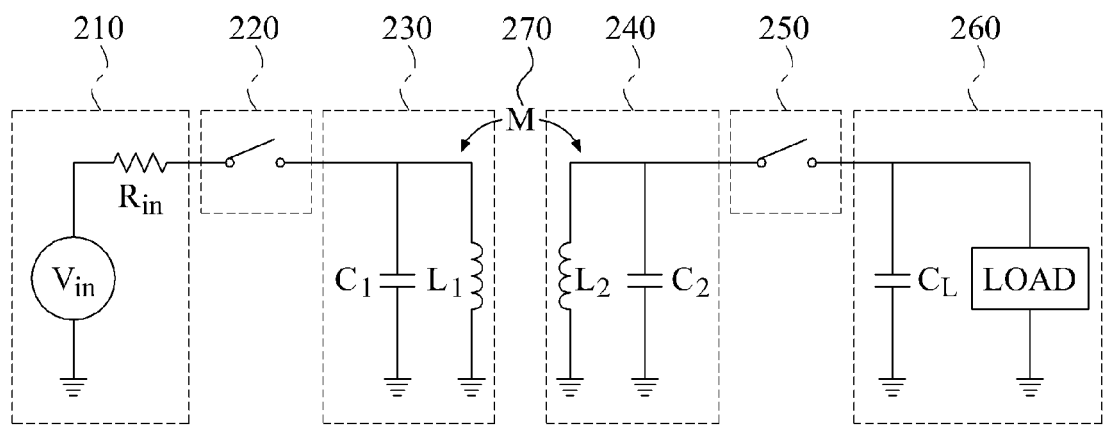
FIG. 2 is a diagram illustrating an equivalent circuit of a communication system using wireless power in which a power charger and a transmitter are physically isolated by a switch, and a charger and a power output unit are physically isolated by another switch.

FIG. 2 illustrates an equivalent circuit of a communication system using wireless power in which a power charger 210 and a transmitter 230 are physically isolated by a switch, and a charger 240 and a power output unit 260 are physically isolated by another switch.

Referring to FIG. 2, the communication system using wireless power may correspond to a source-target configuration having a source and a target. The communication system using wireless power may include a wireless power transmission device corresponding to a source and a wireless power reception device corresponding to a target.

The wireless power transmission device may include the power charger 210, a controller 220, and the transmitter 230. The power charger 210 may include a power supply device $V_{in}$ and a resistor $R_{in}$. A source resonator may include a capacitor $C_1$ and an inductor $L_1$. The transmitter 230 may transmit energy stored in the source resonator through a mutual resonance between the source resonator and a target resonator. The controller 220 may be configured to turn the switch ON to provide power from the power charger 210 to the source resonator. The power supply device $V_{in}$ may apply a voltage to the capacitor $C_1$, and may apply a current to the inductor $L_1$. In response to the wireless power transmission device reaching a steady state, the voltage applied to the capacitor $C_1$ may become "0," and the current flowing through the inductor $L_1$ may have a value of $V_{in}/R_{in}$. At the steady state, the inductor $L_1$ may be charged through the applied current.

The controller 220 may turn the switch OFF when power stored in the source resonator reaches a predetermined value at the steady state. Information of the predetermined value may be set in the controller 220. The power charger 210 and the transmitter 230 may be isolated from each other. The source resonator may initiate a self-resonance between the capacitor $C_1$ and the inductor $L_1$. Energy stored in the source resonator may be delivered to the target resonator through a mutual resonance between the source resonator and the target resonator based on a mutual inductance M 270. A resonant frequency $f_1$ of the source resonator may be equal to a resonant frequency $f_2$ of the target resonator, where:

$$f_1 = \frac{1}{2\pi\sqrt{L_1 C_1}},$$

$$f_2 = \frac{1}{2\pi\sqrt{L_2 C_2}}$$

$$f_1 = f_2$$

The wireless power reception device may include the charger 240, a controller 250, and the power output unit 260. The target resonator may include a capacitor $C_2$ and an inductor $L_2$. When a mutual resonance occurs between the source resonator and the target resonator, the source resonator may be isolated from the power supply device $V_{in}$, and the target resonator may be isolated from a load and a capacitor $C_L$. The capacitor $C_2$ and the inductor $L_2$ of the target resonator may be charged through a mutual resonance. The controller 250 may turn a switch OFF to charge the target resonator. While the switch is in an OFF state, the resonant frequency of the source resonator may be substantially equal to the resonant frequency of the target resonator, and a mutual resonance may occur. In response to power charged in the target resonator reaching a predetermined value, the controller 250 may turn the switch ON. Information of the predetermined value may be set in the controller 250. When the switch is turned ON, the capacitor $C_L$ may be connected to the target resonator, and a resonant frequency of the target resonator may change to $f_2'$, where:

$$f_2' = \frac{1}{2\pi\sqrt{L_2(C_2 + C_L)}}$$

Thus, the mutual resonance between the source resonator and the target resonator may be terminated. When $f_2'$ is small when compared to $f_2$, in consideration of a Quality (Q) factor of the target resonator, a mutual resonant channel may cease to exist. The power output unit 260 may deliver, to the load, power stored in the capacitor $C_2$ and the inductor $L_2$. The power output unit 260 may deliver power in a scheme appropriate for the load.

The controller 250 may turn the switch OFF when power charged in the target resonator has a value less than a predetermined value. The charger 240 may charge the target resonator through a mutual resonance between the source resonator and the target resonator.

The switch may not be turned ON when mutual resonance occurs between the source resonator and the target resonator. Thus, a decrease in transmission efficiency due to a connection of a switch may be prevented.

When the analog circuit of FIG. 2 is compared to an equivalent circuit of FIG. 1 in which energy charged in a capacitor is delivered, it may be easier to control a point in time of capturing energy stored in the target resonator. While the scheme of delivering energy charged in a capacitor may capture energy stored in the capacitor, a scheme of capturing energy by changing a resonant frequency may capture energy stored in an inductor and a capacitor of the target resonator and thus, a degree of freedom for the point in time of capturing energy may be enhanced.

Figure 3:
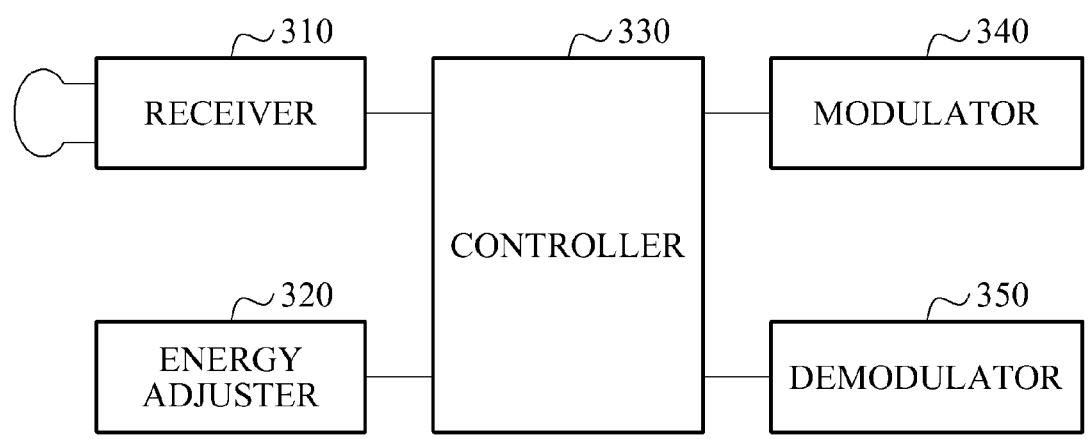
FIG. 3 is a block diagram illustrating a communication device using wireless power.

FIG. 3 illustrates a communication device using wireless power.

The communication system may correspond to a source-target structure including a source and a target. As shown, the source may correspond to a transmission TX end, and the target may correspond to a reception RX end.

The source may transmit data by adjusting an amount of energy stored in a source resonator. A scheme of transmitting data by adjusting an amount of energy stored in a resonator may be referred to as an induced energy (IE) modulation scheme. The IE modulation scheme may be advantageous in that both of the source and the target can support a full duplex scheme. However, energy transmission efficiency may rapidly deteriorate as the distance between the source and the target increases. Further, performance of receiving data may deteriorate as the distance between the source and the target increases due to an incomplete discharge of energy stored in the source resonator and the target resonator.

The source may use the IE modulation scheme when transmitting data to the target, and the target may use a scheme depending on whether a mutual resonance occurs between the source resonator and the target resonator when transmitting data to the source. The scheme depending on whether a mutual resonance occurs may not use additional energy to transmit data at the target, and may transmit data over a relatively long distance when compared to the IE modulation scheme. However, the target may not receive energy from the source in a symbol duration time in which a mutual resonance fails to occur and thus, full duplex communication of simultaneous transmission and reception of data may not be performed.

Referring to FIG. 3, a communication device using wireless power according to aspects includes a receiver 310, a controller 330, a modulator 340, and a demodulator 350. The communication device using wireless power of FIG. 3 may correspond to a reception RX end for receiving energy.

The receiver 310 may receive energy transmitted from a source resonator through a mutual resonance between a target resonator and the source resonator. A transmission TX end may transmit information by adjusting an amount of energy stored in the source resonator. The demodulator 350 may demodulate information transmitted from the source resonator based on an amount of energy received by the receiver 310 in a symbol duration time unit. The receiver 310 may perform a mutual resonance according to a mutual resonance scheme determined by the controller 330 through the target resonator.

The controller 330 may control a mutual resonance scheme between the target resonator and the source resonator. Moreover, the controller 330 may control a time interval for a mutual resonance in the symbol duration unit between the target resonator and the source resonator. The controller 330 may control, in the symbol duration unit, a time interval for storing energy in the target resonator through the mutual resonance and a time interval for capturing the energy stored in the target resonator. The modulator 340 may modulate information based on the time interval for a mutual resonance. For instance, the modulator 340 may modulate information by allocating information based on a length of the time interval, for example, whether the time interval is a long period of time or short period of time, for a mutual resonance. Since the time interval for a mutual resonance may be adjusted to various periods of time, a reception RX end may deliver information of at least one bit, in a single symbol duration time.

The controller 330 may control the mutual resonance scheme with the source resonator using a plurality of target resonators. The controller 330 may control a single target resonator so that the single target resonator may receive energy from the source resonator by mutually resonating with the source resonator continuously. The controller 330 may determine a case in which a predetermined target resonator mutually resonates with the source resonator so that the predetermined target resonator may deliver information to the source resonator based on whether a mutual resonance occurs. The controller 330 may control target resonators so that a target resonator may receive energy and information from the source resonator continuously and another target resonator may transmit information to the source resonator. In this instance, the modulator 340 may modulate information based on whether a mutual resonance occurs between the source resonator and the target resonator. Among the plurality of target resonators, information may be modulated using a target resonator designated to transmit information to the source resonator.

The communication device using wireless power may include an energy adjuster 320. For example, the energy adjuster 320 may adjust an amount of energy expended in the target resonator. The energy adjuster 320 may adjust the amount of energy expended in the target resonator using an active element or a passive element.

In some instances, the active element may additionally provide energy to the target resonator. The energy adjuster 320 may use the active element to compensate for energy expended in the target resonator through the energy additionally provided. Accordingly, the amount of energy expended in the target resonator may decrease.

The passive element may increase the amount of energy expended in the target resonator. The energy adjuster 320 may increase, using the passive element, the amount of energy expended in the target resonator.

A resistance component may include an internal resistance of the target resonator. The active element may include a transistor, an operational amplifier (OP Amp), a diode, and the like. The passive element may include a resistor, and the like. An effective resistance component of the target resonator may change through a control of the amount of energy expended in the target resonator. As the amount of energy expended in the target resonator increases, the effective resistance component may increase. Conversely, as the amount of energy expended in the target resonator decreases, the effective resistance component may decrease.

Since a Q factor of the target resonator may be inversely proportional to a magnitude of a resistance, the Q factor may increase as the effective resistance component decreases. And, as the effective resistance component increases, the Q factor may decrease.

The energy adjuster 320 may quantize the Q factor by adjusting the amount of energy expended in the target resonator. For instance, the controller 330 may match a resonant frequency of the target resonator with a resonant frequency of the source resonator so that the target resonator and the source resonator perform a mutual resonance, continuously. The modulator 340 may modulate information based on the amount of energy expended in the target resonator. For example, the modulator 340 may modulate information based on a quantized Q factor.

The controller 330 may control an electrical connection between the target resonator and a load. Energy stored in the target resonator may be delivered to the load. For example, the controller 330 may open an electrical connection to the load while the target resonator mutually resonates with the source resonator, and may close (i.e., short-circuit) the electrical connection while delivering the energy stored in the target resonator to the load. In some instances, the controller 330 may open or close the electrical connection using a switch. The controller 330 may be used to construct a RI system by controlling the electrical connection between the target resonator and the load, for example.

Figure 4:
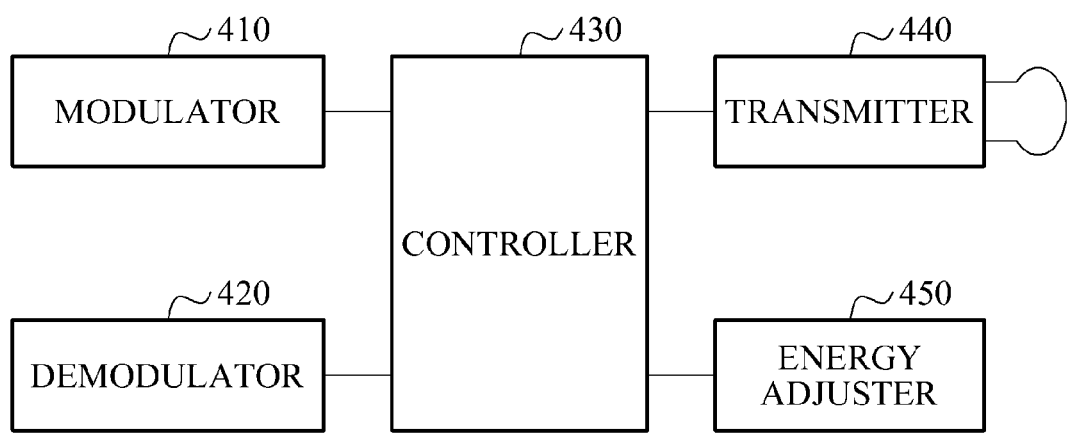
FIG. 4 is a block diagram illustrating another communication device using wireless power.

FIG. 4 illustrates another communication device using wireless power.

Referring to FIG. 4, a communication device using wireless power, according to aspects, includes a modulator 410, a demodulator 420, a controller 430, and a transmitter 440. The communication device using wireless power of FIG. 4 may correspond to a transmission TX end that transmits energy.

The transmitter 440 may transmit energy stored in a source resonator through a mutual resonance. Since the transmitter 440 may transmit energy corresponding to an amount of energy stored in the source resonator, the transmitter 440 may transmit information allocated according to an amount of energy.

The modulator 410 may modulate information based on an amount of energy stored in the source resonator. The source resonator may receive energy delivered from a power supply device. The modulator 410 may modulate information by allocating information according to a level of quantized energy.

The controller 430 may control the amount of energy delivered to the source resonator from a power supply device. The controller 430 may adjust the amount of energy delivered to the source resonator based on information to be transmitted. The controller 430 may control an electrical connection between the power supply device and the source resonator. For example, the controller 430 may open the electrical connection between the power supply device and the source resonator while the source resonator mutually resonates with the target resonator, and may close (i.e., short-circuit) the electrical connection while delivering the energy from the power supply device to the source resonator. For instance, the controller 430 may open or close the electrical connection using a switch. The controller 430 may construct an RI system by controlling the electrical connection between the power supply device and the source resonator.

The demodulator 420 may demodulate information transmitted from the target resonator based on a variation of a waveform of energy stored in the source resonator. A reception end RX end may adjust a time interval for a mutual resonance so that a mutual resonance occurs between the source resonator and the target resonator. A point in time at which the energy stored in the source resonator varies may change when a time interval for a mutual resonance is not uniform. The demodulator 420 may demodulate information transmitted from the target resonator based on a point in time at which a waveform of energy changes within a symbol duration time.

As an example, the demodulator 420 may determine whether a mutual resonance occurs based on a variation of a waveform of energy within a symbol duration time, and may demodulate information transmitted from the target resonator based on whether the mutual resonance occurs. A shape of a waveform of energy stored in the source resonator may change depending on whether the mutual resonance occurs between the source resonator and the target resonator. The demodulator 420 may determine whether the mutual resonance occurs based on a variation of the shape, and may demodulate information.

As another example, the demodulator 420 may demodulate information transmitted from the target resonator based on a magnitude of energy stored in the source resonator within a symbol duration time. The reception RX end may transmit data by adjusting a Q factor of the target resonator. The magnitude of energy stored in the source resonator may change depending on the Q factor of the target resonator. The demodulator 420 may demodulate information transmitted from the target resonator depending on a variation of the magnitude of energy stored in the source resonator. The transmitted information may be identified when a variation of the magnitude is greater than or equal to a predetermined value.

A communication device using wireless power, according to aspects, may include an energy adjuster 450. For example, the energy adjuster 450 may adjust the amount of energy expended in the source resonator. The energy adjuster 450 may adjust the amount of energy expended in the source resonator using an active element or a passive element.

In some instances, the active element may additionally provide energy to the source resonator. The energy adjuster 450 may use the active element to compensate for energy expended in the target resonator through the energy additionally provided. Accordingly, the amount of energy expended in the source resonator may decrease.

The passive element may increase an amount of energy expended in the source resonator. The energy adjuster 450 may increase, using the passive element, the amount of energy expended in the source resonator.

A resistance component may include an internal resistance and a radiation resistance of the source resonator. The radiation resistance may be a resistance component occurring when power is radiated from the source resonator, and may correspond to a real part of an impedance expressed by an equivalent circuit when power is radiated from the source resonator. The active element may include a transistor, an OP Amp, a diode, or the like. The passive element may include a resistor, and the like. An effective resistance component of the source resonator may be changed through a control of the amount of energy expended in the source resonator. As the amount of energy expended in the source resonator increases, the effective resistance component may increase. Conversely, as the amount of energy expended in the source resonator decreases, the effective resistance component may decrease.

Since a Q factor of the source resonator is inversely proportional to a magnitude of a resistance, the Q factor may increase as the effective resistance component decreases. As the effective resistance component increases, the Q factor may decrease.

As the Q factor increases, a distance at which a strong mutual resonance occurs between the source resonator and the target resonator may increase. Through the strong mutual resonance, the performance of transmitting data between the transmission TX end and the reception RX end may be enhanced.

Figure 5:
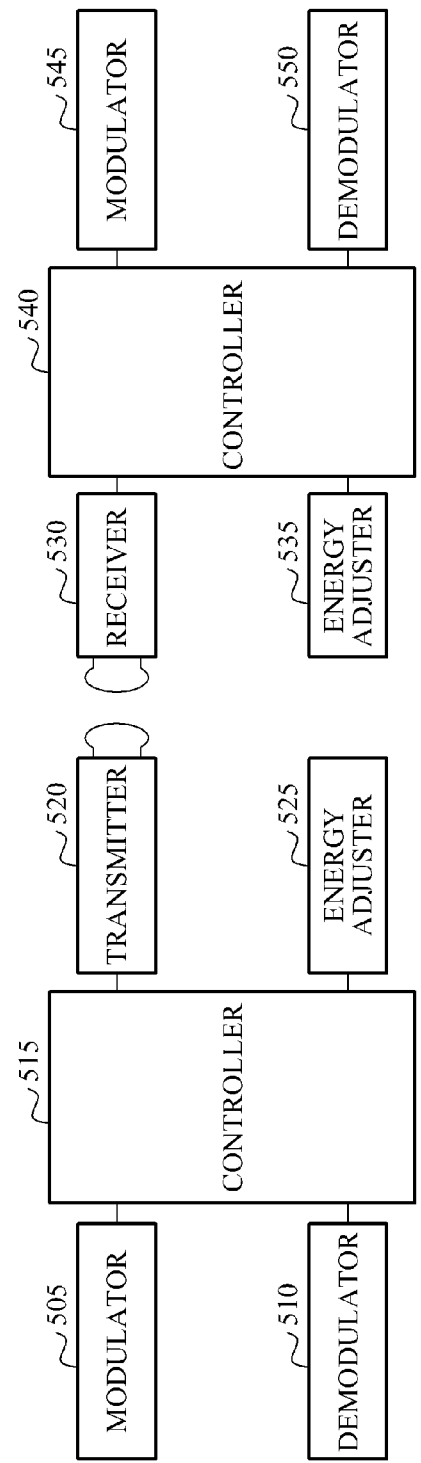
FIG. 5 is a block diagram illustrating a communication system using wireless power.

FIG. 5 illustrates a communication system using wireless power.

Referring to FIG. 5, a communication system using wireless power, according to aspects, includes a transmission TX end and a reception RX end. The transmission TX end may include a modulator 505, a demodulator 510, a controller 515, a transmitter 520, and an energy adjuster 525. The reception RX end may include a receiver 530, an energy adjuster 535, a controller 540, a modulator 545, and a demodulator 550.

At the transmission TX end, the modulator 505 may modulate information based on an amount of energy stored in a source resonator. The transmitter 520 may transmit the energy stored in the source resonator to a target resonator through a mutual resonance. The energy adjuster 525 may adjust an amount of energy expended in the source resonator. The energy adjuster 525 may compensate for, using an active element, the amount of energy expended in the source resonator so that a Q factor of the source resonator has a quantized value. The energy adjuster 525 may increase, using a passive element, energy expended in the source resonator so that the Q factor of the source resonator may be less than a predetermined value.

The controller 515 may control an electrical connection between the source resonator and a power supply device. The controller 515 may adjust an amount of energy stored in the source resonator. The demodulator 510 may calculate a variation of a waveform of energy by detecting a waveform of the energy stored in the source resonator. The demodulator 510 may demodulate information transmitted by the target resonator based on the variation of a waveform. The variation of a waveform may include a variation of a point in time at which the waveform changes, a variation of a shape of the waveform, and/or a variation of the amplitude of the waveform.

At the reception RX end, the receiver 530 may receive energy transmitted from the source resonator through a mutual resonance between the target resonator and the source resonator. The demodulator 550 may demodulate information transmitted by the source resonator based on an amount of energy received by the receiver 530.

The energy adjuster 535 may adjust the amount of energy expended in the target resonator. The energy adjuster 535 may adjust, using the active element or the passive element, the amount of energy expended in the target resonator so that a Q factor of the target resonator may have a quantized value. The controller 540 may adjust a time interval for a mutual resonance in the symbol duration unit between the target resonator and the source resonator.

The controller 540 may control an electrical connection between the target resonator and a load. The controller 540 may change a resonant frequency of the target resonator. The controller 540 may control, in a symbol duration time, a case in which a target resonator continues mutually resonating and another target resonator mutually resonates with the source resonator.

The modulator 545 may modulate information based on a mutual resonance scheme between the target resonator and the source resonator. The modulator 545 may modulate information based on a time interval for a mutual resonance. The modulator 545 may modulate information based on a quantized Q factor. The modulator 545 may modulate information based on whether a mutual resonance occurs.

Figure 6:
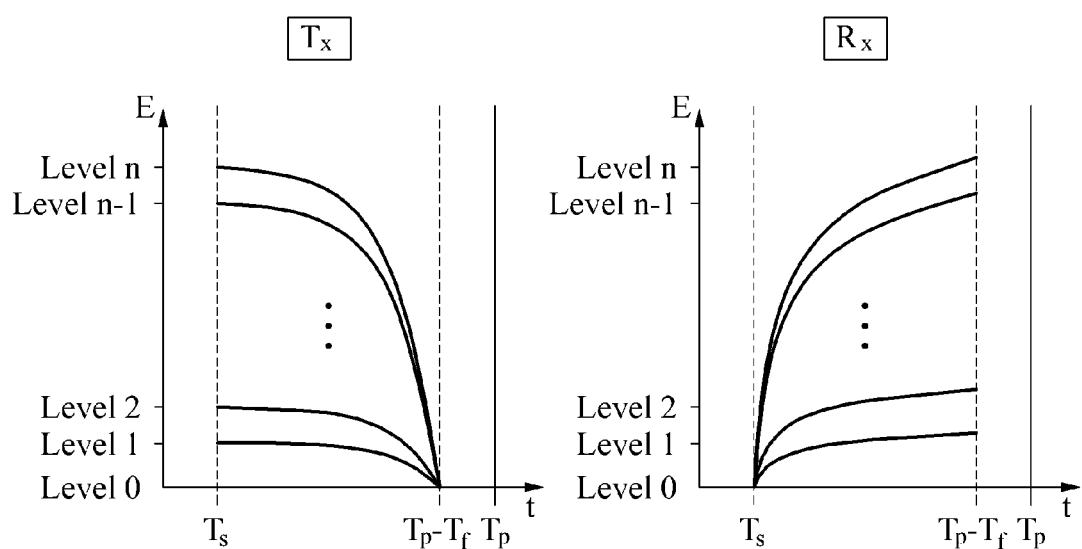
FIG. 6 is a graph illustrating data transmitted by a transmission end $T_x$ and data received by a reception end $R_x$ in a communication system using wireless power.

FIG. 6 illustrates data transmitted by a transmission end $T_x$ and data received by a reception end $R_x$ in a communication system using wireless power.

Referring to FIG. 6, the transmission end $T_x$ may transmit data by adjusting energy stored in a source resonator, and the reception end $R_x$ may receive data based on energy stored in a target resonator.

n+1 energy levels may be predetermined between the transmission end $T_x$ and the reception end $R_x$, and data may be allocated for each energy level. The transmission end $T_x$ may transmit log(n+1) bit information in a single symbol duration time.

Energy stored in the source resonator may be delivered to the target resonator through a mutual resonance between the source resonator and the target resonator. $T_s$ denotes a period of time used for the source resonator to prepare for a mutual resonance, and may correspond to a period of time used for connecting the capacitor to the source resonator of FIG. 1, and may correspond to a period of time used for turning the switch that connects the power supply device and the source resonator of FIG. 2 OFF. During a period of time $T_p$-$T_f$, an entire energy stored in the source resonator may be delivered to the target resonator. At a point in time $T_p$-$T_f$, the reception end $R_x$ may terminate a mutual resonance of the target resonator, and may decode information received based on energy stored in the target resonator.

Figure 7:
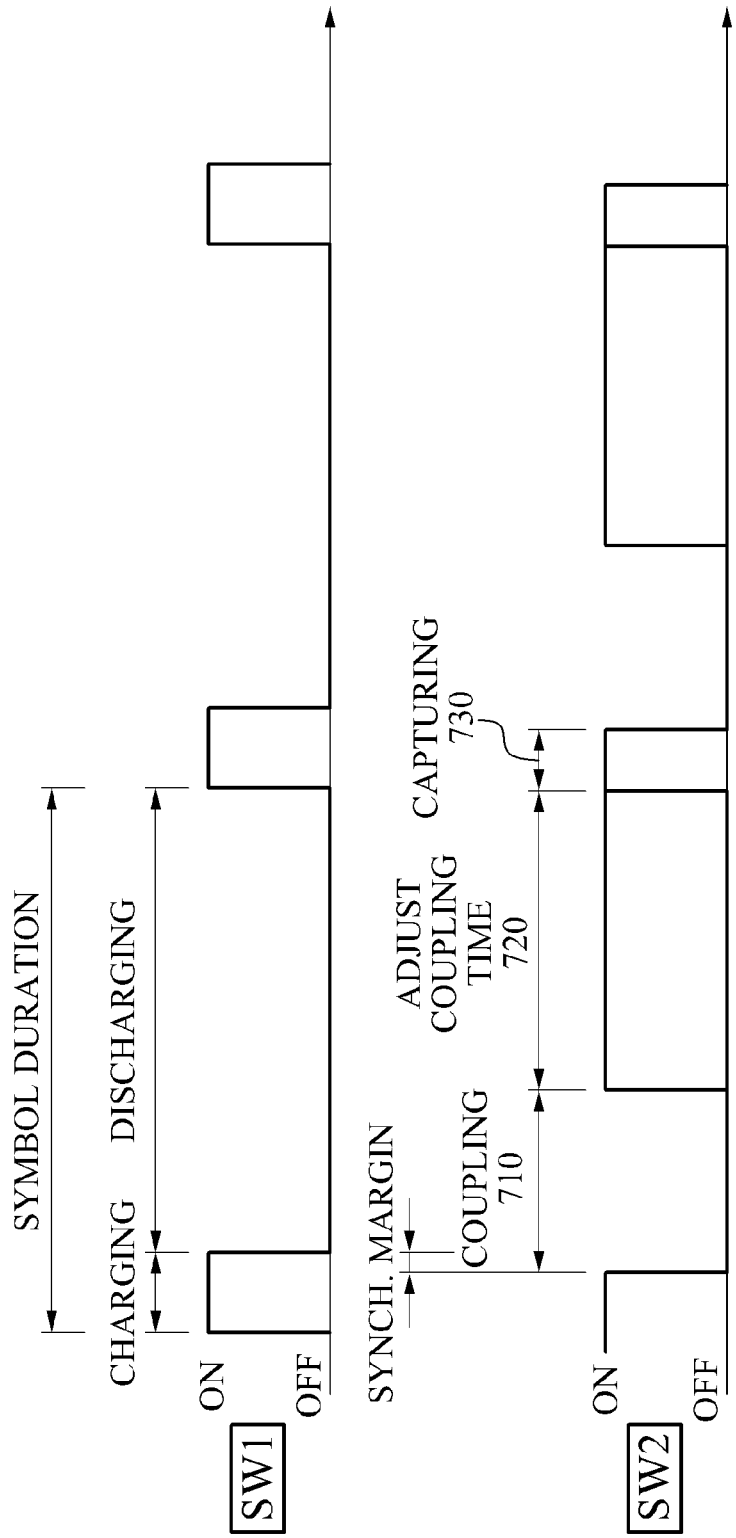
FIG. 7 is a diagram illustrating a process of transmitting information by adjusting a time interval for a mutual resonance at a reception end of a communication system using wireless power.

FIG. 7 illustrates a process of transmitting information by adjusting a time interval for a mutual resonance at a reception end of a communication system using wireless power.

A SW1 may correspond to a switch that connects a power supply device and a source resonator at a transmission TX end. The source resonator may be charged with energy in response to the SW1 being turned ON, and may be discharged in response to the SW1 being turned OFF. A cycle in which the source resonator is charged and discharged may correspond to a single symbol duration time.

A SW2 may correspond to a switch that determines whether to generate a mutual resonance at a reception RX end. The SW2 may connect a target resonator and a capacitor that changes a resonant frequency of the target resonator. In response to the SW2 being turned OFF, the target resonator and the source resonator may mutually resonate (or may be mutually coupled). In a mutually resonating period 710, the target resonator may receive energy transmitted from the source resonator. In response to the SW2 being turned ON, the target resonator may terminate the mutual resonance, and energy stored in the target resonator may be captured. Energy captured in a capturing period 730 may be delivered to a load. At the reception RX end, the communication system using wireless power may adjust the mutually resonating period 710 so as to adjust a coupling time 720. The reception RX end may adjust a mutual resonance period by adjusting an ON/OFF duration of the SW2. That is, a time interval for a mutual resonance may vary by increasing or decreasing. In addition, the waveform of the signal applied to the source resonator may vary depending on the time interval for a mutual resonance. The transmission TX end may demodulate information transmitted by the reception RX end by analyzing the waveform of the signal applied to the source resonator. Within an identical symbol duration time, the reception RX end may demodulate information transmitted from the transmission TX end according to an amount of energy stored in the target resonator through a mutual resonance, and may modulate information by adjusting the time interval for a mutual resonance and thus, communication in a full duplex scheme may be performed.

Since the length of the time interval for mutual resonance may vary in a single symbol duration time, the reception RX end may transmit information of at least one bit in the single symbol duration time.

The transmission TX end may perform a charging and discharging by controlling the SW1 in a single symbol duration time. For instance, the reception RX end may determine whether to generate a mutual resonance (or a coupling) and the length of the time interval for a mutual resonance by controlling the SW2. The reception RX end may secure a synchronization (Synch). Margin used for synchronizing a mutual resonance timing of the transmission TX end and the reception RX end, before a point in time at which the transmission TX end is discharged.

FIG. 8 illustrates a waveform of one signal applied to a source resonator in response to adjusting a time interval for a mutual resonance at a reception end of a communication system using wireless power.

Referring to FIG. 8, when a source resonator and a target resonator are strongly coupled, a waveform of a signal applied to the source resonator has the difference between a signal 810 captured at a Capturing Point 1 and a signal 820 captured at a Capturing Point 2. In response to terminating a capturing, a mutual resonance between the source resonator and the target resonator may be terminated and thus, a signal applied to the source resonator may have a relatively small value. At the reception RX end, information may be modulated by adjusting the time interval for a mutual resonance or by adjusting a capturing point. At the transmission TX end, information transmitted from the reception RX end may be demodulated by identifying a capturing point within a symbol duration time.

On the other hand, when the source resonator and the target resonator are weakly coupled, the waveform of the signal applied to the source resonator may have the difference between a signal 830 captured at a Capturing Point 1 and a signal 840 captured at a Capturing Point 2. At the reception RX end, information may be modulated by adjusting the time interval for a mutual resonance or by adjusting a capturing point. At the transmission TX end, information transmitted from the reception RX end may be demodulated by identifying a capturing point within a symbol duration time even though a difference in a waveform may not be relatively significant when the source resonator and the target resonator are weakly coupled.

Figure 9:
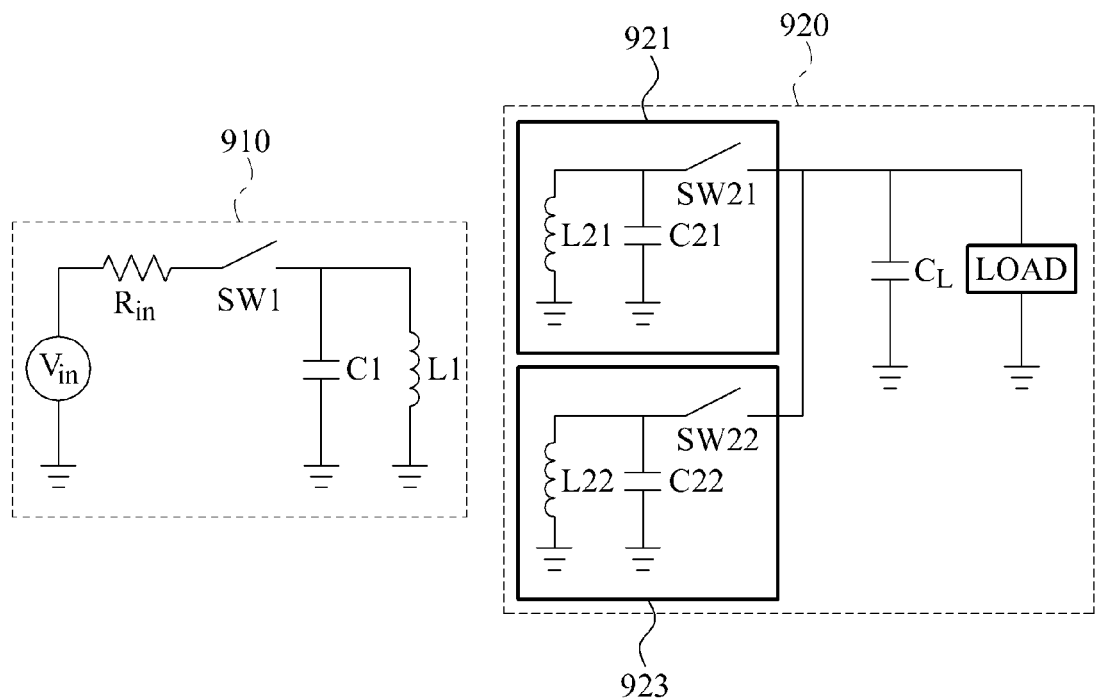
FIG. 9 is an equivalent circuit corresponding to a case of attaining a full duplex using two target resonators at a reception end of a communication system using wireless power.

FIG. 9 illustrates an equivalent circuit corresponding to a case of attaining a full duplex using two target resonators at a reception end of a communication system using wireless power.

A transmission end 910 may store, in a source resonator C1 and L1, energy from a power supply device $V_{in}$ by controlling a switch SW1. In response to the switch SW1 being opened, the source resonator C1 and L1 may self-resonate. When a reception end 920 is located at a position at which a mutual resonance may occur, the transmission end 910 may perform the mutual resonance with the reception end 920.

In some instances, the reception end 920 may include two target resonators 921 and 923. However, it will be appreciated that additional resonators might be used in other embodiments. In response to a switch SW21 being opened, the target resonator 921 may perform a mutual resonance with the source resonator C1 and L1. In response to a switch SW22 being opened, the target resonator 923 may perform a mutual resonance with the source resonator C1 and L1. In response to the switch SW21 being closed (i.e., short-circuited), the mutual resonance may be terminated, and energy stored in the target resonator 921 may be captured and be delivered to a load. In response to the switch SW22 being short-circuited, the mutual resonance may be terminated, and energy stored in the target resonator 923 may be captured and be delivered to a load.

The reception end 920 may open the switch SW21 so that the target resonator 921 may continue to perform the mutual resonance. Thus, energy may be stored continuously in the target resonator 921. The reception end 920 may determine a situation in which the target resonator 923 mutually resonates with the source resonator C1 and L1. The reception end 920 may modulate information based on whether a mutual resonance occurs between the target resonator 923 and the source resonator C1 and L1. The target resonator 923 may transmit information of the reception end 920. That is, the target resonator 921 may receive energy and information from the transmission end 910, and the target resonator 923 may receive energy from the transmission end 910, and may transmit information to the transmission end 910.

Within an identical symbol duration time, the reception end 920 may receive information through the target resonator 921, and transmit information through the target resonator 923 and thus, may perform information in a full duplex scheme.

Figure 10:
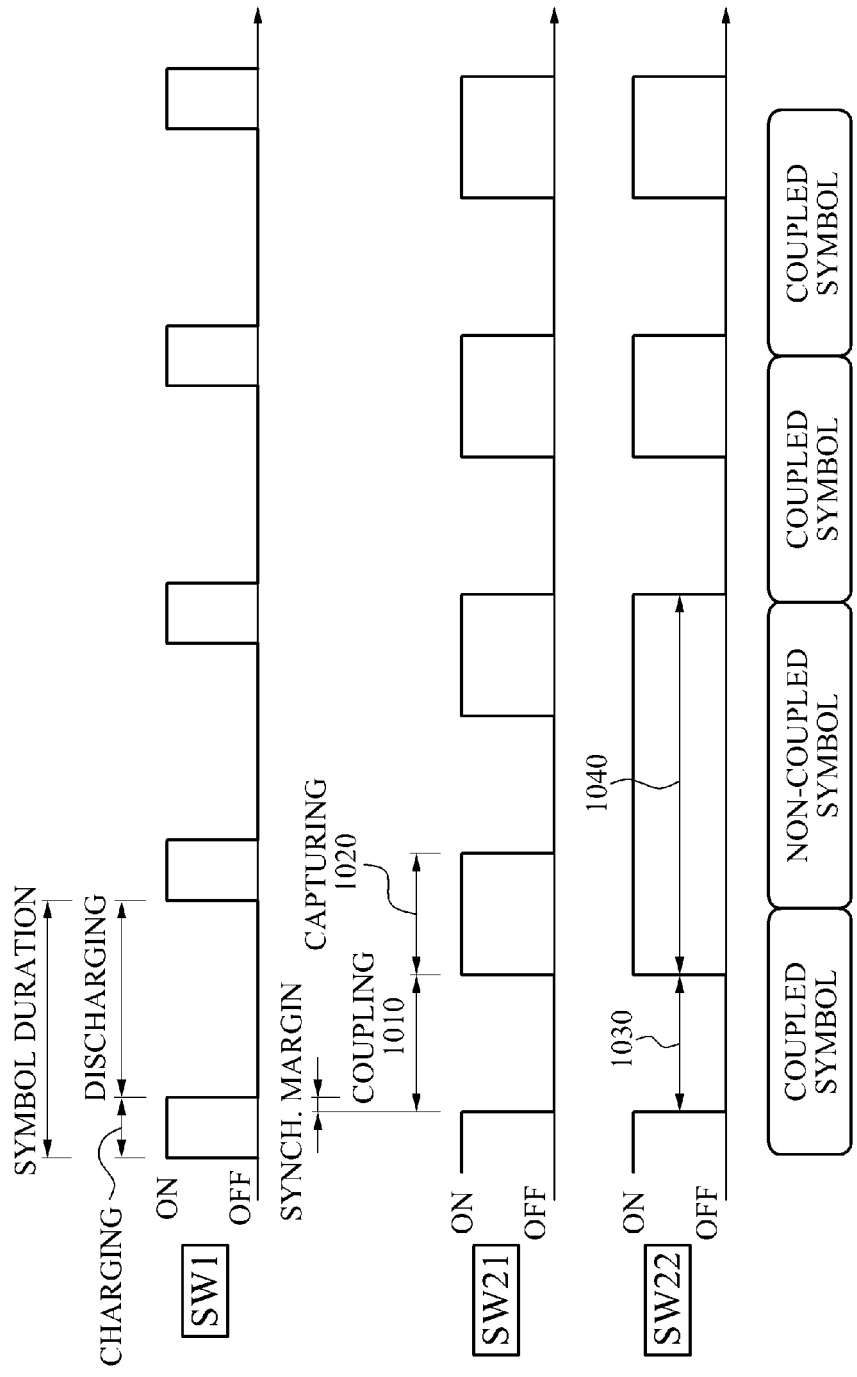
FIG. 10 is a diagram illustrating an operation of a target resonator when two target resonators are used at a reception end of a communication system using wireless power.

FIG. 10 illustrates an operation of a target resonator when two target resonators are used at a reception end of a communication system using wireless power.

A transmission end may perform charging and discharging by controlling a switch SW1 in a single symbol duration time. For instance, a reception end may control a switch SW21 of a first target resonator so that the first target resonator may perform a mutual resonance (or coupling) with a source resonator in 1010, and may capture energy stored in a target resonator in 1020.

The reception end may secure a synchronization (Synch). The margin used for synchronizing a mutual resonance timing of the transmission end and the reception end before a point in time of discharging the transmission end.

The reception end may control a switch SW22 of a second target resonator to perform a mutual resonance in 1030 and a capturing in 1040. A period of the capturing in 1040 may hold in a second symbol duration time, and a mutual resonance may not occur in the second symbol duration time.

The first target resonator may receive energy and information from the source resonator by performing the same operation for each symbol duration time, repeatedly. The reception end may transmit information of the reception end to the source resonator by setting a case of not performing a mutual resonance for each symbol duration time for the second target resonator.

Figure 11:
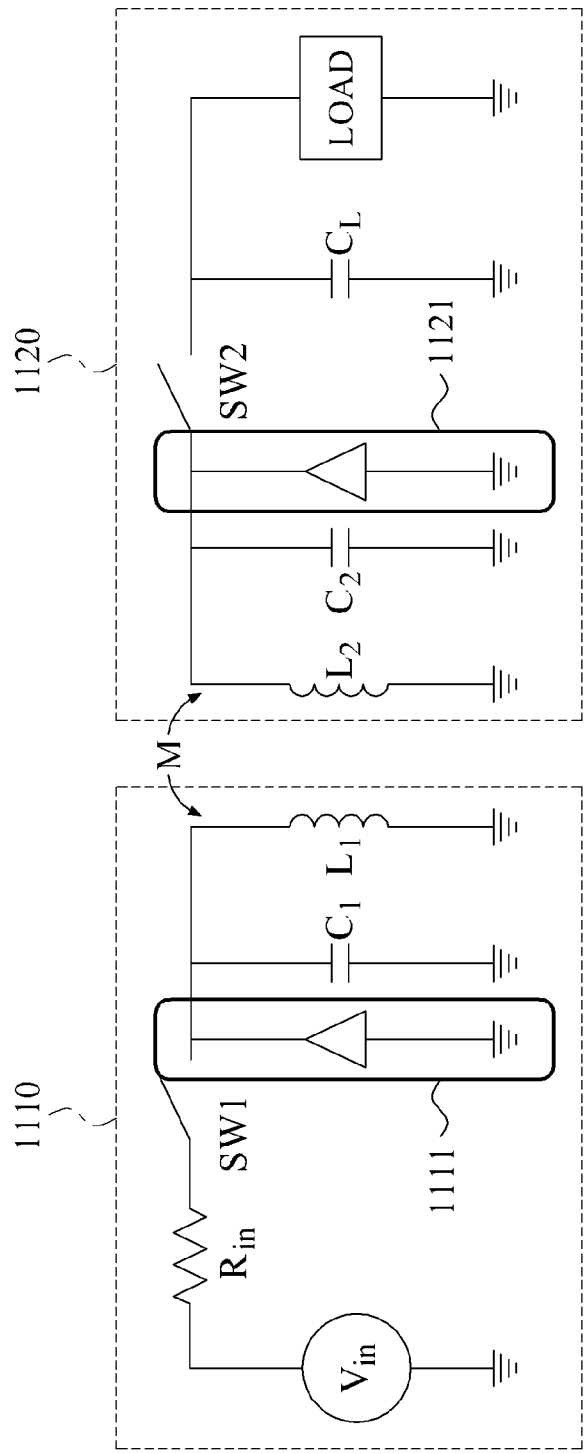
FIG. 11 is an equivalent circuit corresponding to a case of using a negative resistance in a communication system using wireless power.

FIG. 11 illustrates an equivalent circuit corresponding to a case of using a negative resistance in a communication system using wireless power.

An RI system that is charged with energy from a direct current (DC) source and delivers a signal using a mutual resonance phenomenon between a source resonator and a target resonator may have two resonance phenomena of a strong mutual coupling and a weak mutual coupling according to a physical distance between resonators. A Q factor may correspond to a value indicating a ratio of energy expended in each resonator when two resonators mutually resonate. A Q factor may be evaluated as a ratio of stored energy to expended energy. In some instances, the Q factor may correspond to a ratio between energy stored in each resonator and expended energy. Thus, as the Q factor increases, the amount of energy expended in a resonator may decrease.

The source resonator and the target resonator may be strongly mutually coupled when a coupling coefficient k between the source resonator and the target resonator is greater than $k_{sp}$ expressed below, and otherwise may be weakly mutually coupled.

$$k_{sp} = \frac{1}{\sqrt{2}} \sqrt{\frac{1}{Q_1^2} + \frac{1}{Q_2^2}}$$

In this instance, $k_{sp}$ indicates a coupling coefficient corresponding to a criterion between a strong mutual coupling and a weak mutual coupling, $Q_1$ denotes a Q factor of the source resonator, and $Q_2$ denotes a Q factor of the target resonator. For example, when both of $Q_1$ and $Q_2$ correspond to 100, the source resonator and the target resonator may be strongly, mutually coupled for a value of $k_{sp}$ greater than 0.01, and may be weakly, mutually coupled for a value of $k_{sp}$ less than 0.01. As a Q factor increases, the coupling coefficient $k_{sp}$ may decrease. In general, the coupling coefficient $k_{sp}$ is believed to be inversely proportional to a third power of the distance between the source resonator and the target resonator. Thus, as a Q factor increases, the distance at which a strong mutual coupling occurs may increase.

Referring to FIG. 11, the equivalent circuit includes a TX end 1110 and a RX end 1120. A portion provided in a triangular shape at the TX end 1110 corresponds to an active element 1111. A portion provided in a triangular shape at the RX end 1120 corresponds to an active element 1121. An active element may increase a Q factor of the source resonator by compensating for energy expended due to a resistance component in the source resonator. For an RLC serial equivalent circuit, a Q factor may be expressed as the following equation:

$$Q = \frac{1}{R}\sqrt{\frac{L}{C}}$$

As a resistance component R of a resonator decreases, a Q factor may increase. The active element may be used to compensate for energy expended due to a resistance component of the source resonator, thus decreasing an effective resistance component of the source resonator, and increasing a Q factor. The active element may be expressed as a negative resistance to indicate the effective resistance component is decreased.

A passive element may increase the amount of energy expended due to a resistance component in the source resonator. As the amount of energy expended increases, a Q factor may decrease. Using the passive element may enable an effective resistance component of the source resonator to be increases and thus, the Q factor may decrease.

The RX end 1120 may adjust the Q factor by adjusting the amount of energy compensated for through the active element. The RX end 1120 may quantize the Q factor by adjusting the amount of energy compensated for in the target resonator, and may modulate information according to the quantized Q factor.

The RX end 1120 may adjust the Q factor by increasing the amount of energy expended in the target resonator through the passive element. The RX end 1120 may quantize the Q factor by adjusting the amount of energy expended in the target resonator, and may modulate information according to the quantized Q factor. The RX end 1120 may transmit information to the TX end 1110 through a variation of the Q factor of the target resonator.

The RX end 1120 may perform communication in an a full duplex scheme by transmitting information to the TX end 1110 through a variation of the Q factor of the target resonator in conjunction with receiving information from the TX end 1110 through a mutual resonance.

FIG. 12 illustrates a graph illustrating one waveform of a signal applied to a source resonator when a Q value of the source resonator varies in a communication system using wireless power.

When a source resonator and a target resonator are strongly coupled, a waveform of a signal applied to the source resonator of a low Q may be different from a waveform of a signal applied to the source resonator of a high Q after compensating for energy expended in the target resonator. The waveform of a signal applied to the source resonator of a high Q may be greater in magnitude than the waveform of a signal applied to the source resonator of a low Q. A transmission TX end may demodulate information transmitted from a reception RX end through a variation of a waveform. By adjusting the Q factor of the target resonator, a variation of a waveform of a signal applied to the source resonator may be diversified.

When the source resonator and the target resonator are weakly coupled, the waveform of the signal applied to the source resonator of a low Q factor may be different from the waveform of the signal applied to the source resonator of a high Q factor after compensating for energy expended. The TX end may demodulate information transmitted from the reception RX end through a variation of a waveform.

The units and other elements described herein may be implemented using hardware components, software components, or a combination thereof, in some embodiments. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums. The computer readable recording medium may include any data storage device that can store data which can be thereafter read by a computer system or processing device. Examples of the computer readable recording medium include read-only memory (ROM), random-access memory (RAM), CD-ROMs, magnetic tapes, floppy disks, optical data storage devices. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication device using wireless power, the communication device comprising:
    a controller configured to control mutual resonance between a target resonator and a source resonator;
    a demodulator configured to demodulate information transmitted from the source resonator based on an amount of energy received from the source resonator; and
    a modulator configured to modulate information based on the mutual resonance within a time unit of a plurality of time units,
    wherein at least one bit is modulated in each time unit of the plurality of time units.

2. The communication device of claim 1, wherein the controller is further configured to control a time interval for the mutual resonance between the target resonator and the source resonator.

3. The communication device of claim 2, wherein the controller is further configured to control a time interval for storing energy in the target resonator through the mutual resonance and a time interval for capturing the energy stored in the target resonator.

4. The communication device of claim 2, wherein the modulator is further configured to modulate the information based on the time interval for mutual resonance.

5. The communication device of claim 1, wherein the controller is further configured to
    control the target resonator so that the target resonator receives energy, transmitted from the source resonator, through the mutual resonance for one or more symbol duration times, and
    determine whether at least one target resonator, other than the target resonator, mutually resonates with the source resonator.

6. The communication device of claim 5, wherein the modulator is further configured to modulate the information based on whether the at least one target resonator and the source resonator mutually resonate.

7. The communication device of claim 1, further comprising:
    an energy adjuster configured to adjust an amount of energy expended in the target resonator,
    wherein the controller is configured to control a resonant frequency of the target resonator so that the target resonator and the source resonator mutually resonate.

8. The communication device of claim 7, wherein the energy adjuster is further configured to adjust, using an active element or a passive element, the amount of energy expended in the target resonator so that a Quality (Q) factor of the target resonator has a quantized value.

9. The communication device of claim 7, wherein the modulator is further configured to modulate the information based on the amount of energy expended.

10. The communication device of claim 1, further comprising:
    a receiver configured to receive energy transmitted from the source resonator through the mutual resonance between the target resonator and the source resonator.

11. The communication device of claim 10, wherein the controller is further configured to control an electrical connection between the target resonator and a load to which the received energy is delivered.

12. The communication device of claim 1, wherein the amount of energy is determined within the time unit.

13. The communication device of claim 12, wherein the modulator is further configured to modulate information based on a period of mutual resonance within the time unit.

14. The communication device of claim 1, wherein the amount of energy is determined to be at one of a plurality of predetermined energy levels.

15. The communication device of claim 14, wherein the amount of energy is indicative of a plurality of bits.

16. The communication device of claim 1, wherein at least one bit is transmitted in the period of mutual resonance based on a long period of mutual resonance or a short period of mutual resonance within the time unit.

17. The communication device of claim 1, wherein a waveform of the energy is determined at a receiver within the time unit.

18. The communication device of claim 1, wherein at least one bit is demodulated in each time unit of the plurality of time units.

19. A communication device using wireless power, the communication device comprising:
- a controller configured to control mutual resonance between a target resonator and a source resonator;
- a demodulator configured to demodulate information transmitted from the source resonator based on an amount of energy received from the source resonator;
- a modulator configured to modulate information based on the mutual resonance within a time unit of a plurality of time units; and
- an energy adjuster configured to adjust an amount of energy expended in the target resonator, wherein at least one bit is modulated in each time unit of the plurality of time units.

20. A communication device using wireless power, the communication device comprising:
- a controller configured to control mutual resonance between a target resonator and a source resonator;
- a demodulator configured to demodulate information transmitted from the source resonator based on an amount of energy received from the source resonator; and
- a modulator configured to modulate information based on the mutual resonance within a time unit of a plurality of time units, wherein at least one bit is modulated in each time unit of the plurality of time units, and wherein a waveform of the energy is determined at a receiver within the time unit.

* * * * *